(12) United States Patent  (10) Patent No.: US 9,321,353 B2
Ozaki  (45) Date of Patent: Apr. 26, 2016

(54) MOTOR CONTROL DEVICE
(71) Applicant: NTN CORPORATION, Osaka (JP)
(72) Inventor: Takayoshi Ozaki, Iwata (JP)
(73) Assignee: NTN CORPORATION, Osaka (JP)
( * ) Notice: Subject to any disclaimer, the term of this patent is extended or adjusted under 35 U.S.C. 154(b) by 0 days.
(21) Appl. No.: 14/359,736
(22) PCT Filed: Nov. 22, 2012
(86) PCT No.: PCT/JP2012/080322
§ 371 (c)(1),
(2) Date: May 21, 2014
(87) PCT Pub. No.: WO2013/077408
PCT Pub. Date: May 30, 2013
(65) Prior Publication Data
US 2014/0330471 A1 Nov. 6, 2014
(30) Foreign Application Priority Data Nov. 24, 2011 (JP) .................. 2011-256140

(51) Int. Cl.
B60L 3/00 (2006.01)
B60L 3/06 (2006.01)
(Continued)
(52) U.S. Cl.
CPC .............. B60L 3/003 (2013.01); B60K 7/0007 (2013.01); B60K 17/046 (2013.01); B60L 1/003 (2013.01);
(Continued)
(58) Field of Classification Search
CPC ....... B60L 2220/44; B60L 3/003; B60L 3/06; H02H 7/122; B60K 7/0007; B60K 17/046; H02M 1/32; H02M 2001/327; H02J 5/00; H02J 3/36; H02J 13/0096
USPC .................... 363/50, 55, 56.01, 56.1; 701/22; 700/90, 299
See application file for complete search history.

(56) References Cited

U.S. PATENT DOCUMENTS 5,934,398 A * 8/1999 Hotta ................... B60L 3/0023
                                                                       180/65.31
2012/0245776 A1* 9/2012 Okada ................. B60K 7/0007
                                                                       701/22
2013/0009450 A1* 1/2013 Suzuki et al. .................. 301/6.5

FOREIGN PATENT DOCUMENTS

JP     10-210790       8/1998
JP     11-252932    *  9/1999
(Continued)

OTHER PUBLICATIONS

International Preliminary Report on Patentability mailed on Jun. 5, 2014 in corresponding International Patent Application No. PCT/JP2012/080322.

(Continued)

Primary Examiner — Fadey Jabr
Assistant Examiner — Aaron L Troost

(57) ABSTRACT

An inverter is provided with a temperature sensor for detecting the temperature of the inverter. A plurality of threshold values are set up for the temperature detected by the temperature sensor, electric current restricting conditions different from each other are set up for each of the temperature regions sorted out by each threshold value, and an inverter restricting unit for applying a restriction to an electric current command applied to the inverter in dependence on the electric current restricting condition of the temperature region, in which the detected temperature is included. Without the drivability of an automobile being disturbed, by means of a temperature control of the inverter, not only are any change in characteristic and impairment, resulting from an overheating thereof, prevented, but also an undesirable reduction of the life of the inverter is avoided.

8 Claims, 10 Drawing Sheets

(51) Int. Cl.
*B60L 1/00* (2006.01)
*B60L 3/10* (2006.01)
*B60L 11/18* (2006.01)
*B60L 15/00* (2006.01)
*B60L 15/02* (2006.01)
*B60L 15/20* (2006.01)
*B60K 7/00* (2006.01)
*B60K 17/04* (2006.01)
*F16H 1/32* (2006.01)
*H02M 1/32* (2007.01)

(52) U.S. Cl.
CPC .............. *B60L 3/0061* (2013.01); *B60L 3/06* (2013.01); *B60L 3/102* (2013.01); *B60L 11/1803* (2013.01); *B60L 15/007* (2013.01); *B60L 15/025* (2013.01); *B60L 15/2036* (2013.01); *B60L 15/2054* (2013.01); *B60K 2007/0038* (2013.01); *B60K 2007/0092* (2013.01); *B60L 2220/14* (2013.01); *B60L 2220/44* (2013.01); *B60L 2220/50* (2013.01); *B60L 2240/12* (2013.01); *B60L 2240/24* (2013.01); *B60L 2240/421* (2013.01); *B60L 2240/423* (2013.01); *B60L 2240/425* (2013.01); *B60L 2240/486* (2013.01); *B60L 2240/525* (2013.01); *B60L 2240/529* (2013.01); *B60L 2250/16* (2013.01); *B60L 2250/26* (2013.01); *B60L 2260/28* (2013.01); *F16H 2001/325* (2013.01); *H02M 2001/327* (2013.01)

(56) References Cited

FOREIGN PATENT DOCUMENTS

| JP | 2000-32768 | 1/2000 | | |
|---|---|---|---|---|
| JP | 2001-169401 | 6/2001 | | |
| JP | 2003-304604 | 10/2003 | | |
| JP | 2005-341701 | 12/2005 | | |
| JP | 2007-060866 | 3/2007 | | |
| JP | 2007-244072 | 9/2007 | | |
| JP | 2008-168790 | 7/2008 | | |
| JP | 2008-228510 A | * | 9/2008 | |
| JP | WO 2011071014 A1 | * | 6/2011 | ............... B60K 7/00 |
| WO | WO 2011/071014 A1 | * | 6/2011 | |
| WO | WO 2011/118696 A1 | * | 9/2011 | |
| WO | WO 2011/138827 | | 11/2011 | |

OTHER PUBLICATIONS

International Search Report mailed Feb. 5, 2013 in corresponding International Patent Application No. PCT/JP2012/080322.
U.S. Appl. No. 14/359,430, filed May 20, 2014, Takayoshi Ozaki, NTN Corporation.
Japanese Notice of Reason(s) for Rejection issued Nov. 24, 2015 in corresponding Japanese Patent Application No. 2011-256140.
Chinese Office Action issued Jul. 17, 2015 in corresponding Chinese Patent Application No. 201280057381.6.

* cited by examiner

MOTOR CONTROL DEVICE

CROSS-REFERENCE TO THE RELATED APPLICATIONS

This application is a U.S. national stage application of PCT/JP2012/080322 filed Nov. 22, 2012 and claims foreign priority benefit of Japanese Patent Application No. 2011-256140 filed Nov. 24, 2011 in the Japanese Intellectual Property Office, the contents of which are incorporated herein by reference.

BACKGROUND OF THE INVENTION

1. Field of the Invention

The present invention relates to a motor control device of an electrically driven motor and, more particularly, to a control device of a type used to drive a vehicle wheel in an electric automobile such as, for example, a battery driven automobile, a fuel battery driven automobile or a hybrid automobile with an engine concurrently.

2. Description of Related Art

In the electric automobiles, a synchronous motor and an induction motor are generally employed and are driven by a current, which has been converted from a direct current of a battery into an alternating current by an inverter. Since the inverter, comprised mainly of a plurality of semiconductor switching elements, is supplied with a large amount of electric current for the motor drive, heat generation is considerable. Since the semiconductor switching element has its characteristic variable with temperature and may be apt to be impaired by an excessive heating, the inverter is generally provided with a cooling unit. It is to be noted that in the conventional in-wheel motor drive device, in order to secure the reliability, a wheel support bearing unit, a speed reducer or a reduction gear, the motor or the like are measured as to their temperature to monitor an excessive loading so that in dependence on the measured temperature the driving current of the motor is limited or the motor rotation number is reduced. In this respect, see, for example, the patent document 1 listed below.

[Patent Document 1] JP Laid-open Patent Publication No. 2008-168790

As discussed above, the inverter employed in the conventional electric automobile is provided with the cooling unit and is, therefore, prevented from an excessive increase of the temperature with a normal drive. It has however been found that when on a sloping road or the like the automobile is driven under a high torque generating condition for a long time, the flowing electric current then flowing becomes large, and so it is often that change in characteristic or impairment of the inverter occurs as a result of the excessive heating. Also, the excessive increase of the temperature of the semiconductor switching elements may possibly lower the life of the inverter. Thus, the change in characteristic of the inverter, impairment thereof and the reduction in life of the inverter leads to a change in controlling characteristic of the motor drive and the incapability of motor drive. In addition, where the driving current of the motor is restricted by monitoring the excessive loading through the measurement of the inverter temperature, the drivability of the automobile is possibly disturbed suddenly.

In view of the foregoing, the present invention has for its object to provide a motor control device of a motor which is effective to prevent the inverter from being changed in characteristic, being impaired and/or lowering the life, and also to accomplish a proper countermeasure to be taken quickly without suddenly disturbing of the drivability of the automobile.

Hereinafter, the summary of the present invention will be hereinafter described with the aid of reference numerals shown in the accompanying drawings and used for facilitating a better understanding of preferred embodiments of the present invention.

SUMMARY OF THE INVENTION

The motor control device designed in accordance with the present invention is a motor control device of controlling the motor 6 used in an electric automobile of a type having the motor 6 for driving a vehicle wheel 2, which automobile includes an ECU 21, which is an electric control unit configured to control the automobile in its entirety, and an inverter device 22. The inverter device 22 comprises a power circuit unit 28 including an inverter 31 to convert a direct current power of a battery into an alternating current used in driving the motor 6 and a motor control unit 29 configured to control at least the power circuit unit 28 in accordance with a control of the ECU 21, a temperature sensor Sa provided in the inverter 31 to detect the temperature Tc of the inverter 31, for which detected temperature Tc a plurality of threshold values are set up, and an inverter restricting unit 95 configured to apply a restriction to an electric current command to the inverter 31, while electric current restricting conditions different from each other are set up for respective temperature regions sorted out by each threshold value, in dependence on the electric current restricting condition of the temperature region to which the detected temperature Tc belongs. It is to be noted that the term "electric automobile" referred to hereinabove and hereinafter is to be construed as including a hybrid automobile which concurrently utilizes an engine.

According to the above described construction, the temperature sensor Sa detects the temperature Tc of the inverter 31 at all times. For example, when the electric automobile is driven continuously on a sloping road or the like under a high torque generating condition, not only does the temperature Tc of the inverter 31 increase, but the temperature of the motor coil 78 also increases. The temperature detection of the inverter 31 by the temperature sensor Sa is such a poor response that the plurality of the threshold values are set up for the temperature Tc and the electric current restricting conditions that are different from each other are set up for each of the temperature regions sorted out by each of the threshold value. In other words, when the temperature Tc to be detected is relatively low, the electric current restricting conditions are relieved and the higher temperature Tc to be detected becomes, the more the electric current restricting condition regulated.

The inverter restricting unit 95 performs a control to restrict to the electric current command to the inverter 31 in dependence on the electric current restricting condition of the temperature region to which the detected temperature Tc belongs. More specifically, the control takes place to change one or both of the duty ratio and the pulse number. For example, by making the duty ratio, which is representative of the ON time of the pulse relative to the switching cycle time smaller than a preset duty ratio to lower the voltage effective value or by generating uneven width pulse while the switching cycle is set to the same cycle, the electric current command to be applied to the inverter 31 can be restricted. Therefore, a meticulous temperature control of the inverter 31 can be accomplished and any change in characteristic, impairment of the inverter 31 and reduction in life of the inverter 31 can be avoided. Accordingly, it is possible to prevent the deterioration of the insulating performance of the motor coil and also to prevent the motor from falling into a driving incapability, and, therefore, it possible to avoid the driving of the automobile from being suddenly disturbed.

The inverter restricting unit 95 referred to above may be configured to change a permissible upper limit of the time dependent change dTc/dt of the inverter temperature, in which the temperature Tc is differentiated by time t, in dependence on each sorted temperature region when the time dependent change dTc/dt of the inverter temperature is positive. By changing the permissible upper limit of the time dependent change dTc/dt of the inverter temperature in dependence on each of the sorted temperature regions, the meticulous temperature control of the of the inverter 31 can be accomplished. For example, when the temperature Tc to be detected is relatively low, since the inverter 31 will not be immediately impaired, even though the degree of change of the temperature Tc is steep, the permissible upper limit of dTc/dt is relieved. Conversely, as the temperature Tc to be detected becomes high, even though the degree of change of the temperature Tc is moderate, it leads to a change in characteristic impairment of the inverter 31 and reduction of the life of the inverter 31. Accordingly, by changing the permissible upper limit of the time dependent change dTc/dt of the inverter temperature in dependence on each of the sorted temperature regions to accomplish the temperature control of the inverter 31, the impairment and other of the inverter 31 can be avoided.

The inverter restricting unit 95 may be configured to set the permissible upper limit of the time dependent change dTc/dt of the inverter temperature so as to decrease from a low temperature side towards a high temperature side for each of the temperature region in which the detected temperature Tc belongs. By setting the time dependent change dTc/dt of the inverter temperature in this way, the temperature control of the inverter 31 can be easily and accurately accomplished. In other words, when the inverter temperature Tc is low, there is no possibility of the semiconductor switching element being immediately impaired or otherwise damaged, an abrupt increase of the temperature Tc is permitted even where the response of the temperature detection is poor. When the inverter temperature Tc is high, impairment or otherwise damage to the semiconductor switching element is apt to occur and therefore a strong restriction is made to avoid the abrupt increase of the temperature Tc. It is also possible that the temperature regions sorted out by each threshold value are further meticulously divided and the permissible upper limit of dTc/dt from a low temperature side towards a high temperature side is linearly reduced. In this case, the temperature control of the inverter 31 can be further meticulously accomplished.

The inverter restricting unit 95 may be configured to restrict the dTc/dt by controlling an electric current value of the motor 6. If the inverter restricting unit 95 performs a control to apply a restriction to the electric current command to be applied to the inverter 31 at a certain inverter temperature Tc, the time dependent change dTc/dt of the inverter temperature demonstrates a tendency of being constant or decreasing. When this tendency of dTc/dt is recognized, that is, when the time dependent change of the inverter temperature attains a value equal to or lower than zero (0), since the control of the electric current command to the inverter 31 is released without waiting for the decrease of the actual temperature Tc, a sudden drive restrict of the motor 6 is avoided without the motor current being decreased too much.

Even though the temperature Tc of the inverter 31 starts increasing as a result of the control release of the inverter restricting unit 95, the temperature Tc to be detected is at that time higher than the threshold value in the temperature region in which this temperature Tc is included, and increase of dTc/dt over the upper limit value of the temperature region, in which the temperature Tc to be detected is included, results again in the control to limit the electric current command to the inverter 31. For this reason, when the time dependent change dTc/dt of the inverter temperature attains the value equal to or lower than zero, even the release of the control to restrict the electric current command to the inverter 31 is effective to assuredly avoid the overloading. Accordingly, the impairment or otherwise damage resulting from the overheating of the inverter 31 is avoided and any change in control characteristic of the motor drive and the incapability of the motor drive can be avoided.

The inverter restricting unit 95 may include a determining unit configured to determine whether or not the temperature Tc, detected by the temperature sensor, exceeds each of the threshold values and the control device may include an abnormality annunciating unit configured to output an abnormality annunciation of the inverter 31 to the ECU 21 in the event that the determining unit determines the detected temperature Tc exceeding a predetermined threshold value among the plurality of the thresholds. In this case, with the abnormality annunciation of the inverter 31 being outputted to the electric control unit 21, a proper control over the entire automobile can be accomplished by the electric control unit 21. Depending on the situation, the inverter restricting unit 95 may be included within the electric control unit 21.

The motor 6 referred to above may be a motor to individually drive the vehicle wheels 2 of the electric automobile. The use may be made of an in-wheel motor drive device in which the motor is in part or in whole disposed inside the vehicle wheel. The in-wheel motor drive device 8 may include the motor 6, a wheel support bearing unit 4 and a reduction gear 7. In the case of the in-wheel motor drive device 8, as a result of compactization, the wheel support bearing unit 4, the reduction gear 7 and the motor 6 come to require reduction of the respective materials used and a high speed design of the motor 6. Therefore, those reliability securement is a major concern. In particular when the temperature of the inverter 31 is detected and the abnormality caused by overheating of the inverter 31, for example, thermal runaway or the like resulting from overheating of the semiconductor switching elements are monitored at all times, the control to properly restrict the electric current command to be applied to the inverter 31 can be accomplished.

The use may be made of a reduction gear 7 to reduce the speed of rotation of the motor 6, the reduction gear 7 being a cycloid reduction gear having a speed reducing ration of 4 or higher. If the reduction gear 7 is employed in the form of the cycloid reduction gear and the speed reducing ration thereof is set to a value equal to or higher than 4, the motor 6 can be compactized and the compactization of the device can be accomplished. If the speed reducing ration is chosen to be high, the motor 6 is employed which is of a type capable of undergoing a high speed rotation. Since the impairment and other damage to the inverter 31 can be avoided and any change in control characteristic of the motor drive and the incapability of the motor drive can be avoided during the high speed rotation of the motor 6, it is possible to prevent the automobile from suddenly failing to run.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as restricting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
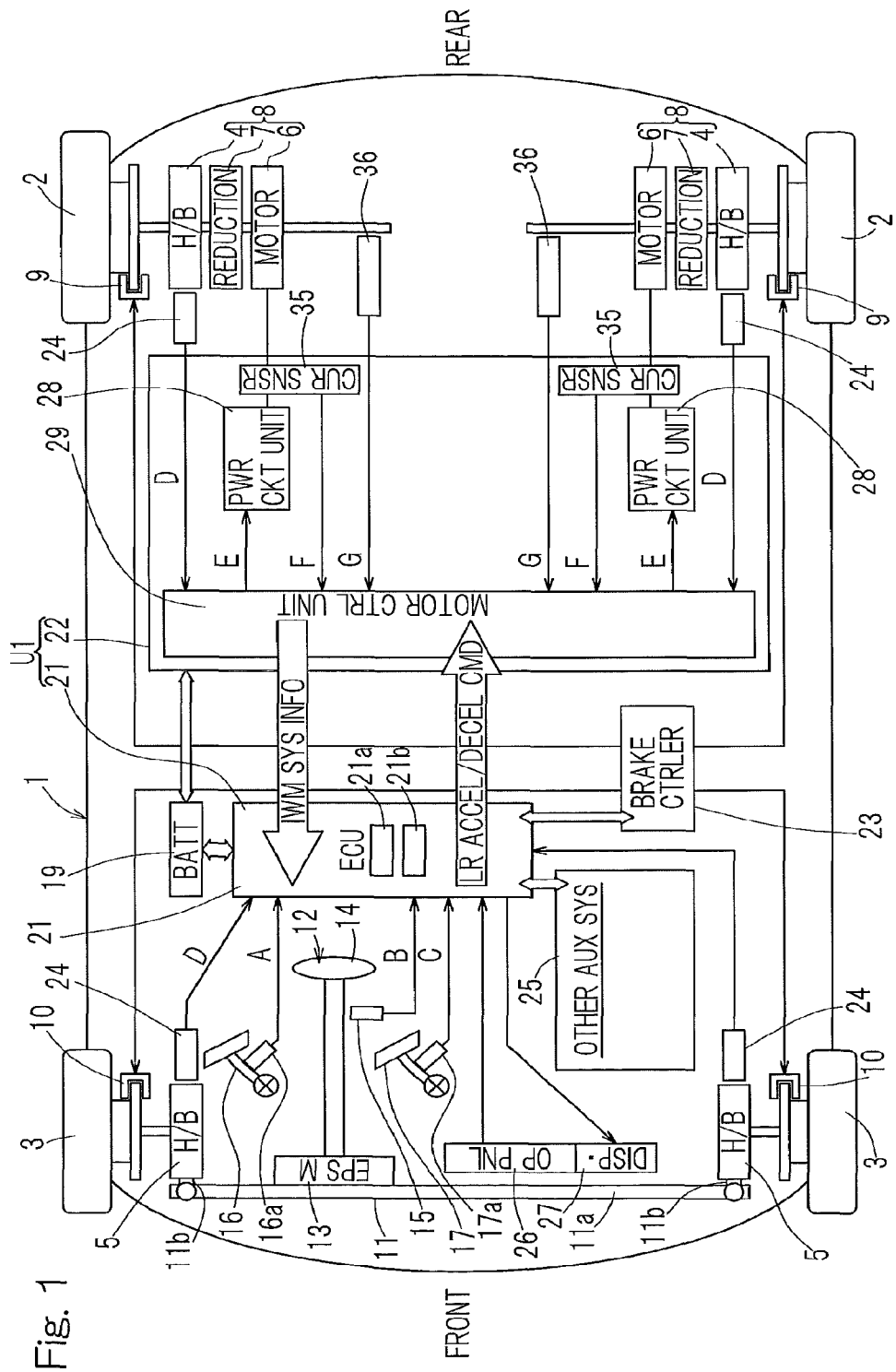
FIG. 1 is a block diagram showing a conception of an electric automobile designed in accordance with a first embodiment of the present invention, with the automobile schematically shown in a plan view.

A first embodiment of the present invention will be described in detail with particular reference to FIGS. 1 to 10. A motor control device of controlling a motor according to this first embodiment is mounted on an electric vehicle. This electric automobile is a four wheeled vehicle having a vehicle body structure 1 including left and right rear wheels 2, which serve as respective driving wheels, and left and right front wheels 3 which serve as respective steerable wheels or driven wheels. The wheels 2 and 3, which will become the driving wheels and the driven wheels, respectively, have corresponding tires that are supported by the vehicle body structure 1 through associated wheel support bearing assemblies 4 and 5. Each of the wheel support bearing assemblies 4 and 5 are designated in FIG. 1 by "H/B" that is an abbreviation representative of a hub bearing. The left and right wheels 2 and 2, which are the driven wheels, are driven by respective driving motors 6 and 6 that runs independently from each other. Rotation of the motor 6 is transmitted to the wheel 2 through a speed reducer or a reduction gear 7 and the wheel support bearing unit 4. The motor 6, the reduction gear 7 and the wheel support bearing unit 4 altogether form an in-wheel motor drive device 8 which is a single assembled component, and the in-wheel motor drive device 8 is disposed in part or in whole within the wheel 2. The in-wheel motor drive device 8 is also referred to as an in-wheel motor unit. The motor 6 may, however, be of a type capable of driving the wheel 2 directly without the intervention of the reduction gear 7. Each of the wheels 2 and 3 is provided with respective electrically operated brakes 9 and 10.

The steerable wheels 3 and 3, which are the left and right front wheels, are steerable through a rudder mechanism 11 and are steered by a steering mechanism 12. The rudder mechanism 11 is a mechanism of a structure in which, as a tie rod 11a is moved in a lateral direction leftward or rightwards, respective angles of left and right knuckle arms 11b which hold the respective wheel support bearing assemblies 5 can be altered, and is moved leftwards or rightwards through a rotary-to-linear motion converting mechanism (not shown) when an electrically powered steering (EPS) motor 13 is driven in response to a command of the steering mechanism 12. The steering angle is detected by a steering sensor 15 and this sensor output is outputted to an electric control unit 21, information of which is used in acceleration/deceleration commands and other for the left and right wheels.

A control system will now be described. As shown in FIG. 1, a control device U1 includes the electric control unit (ECU) 21, which is a unit for performing a control of the entire automobile, and an inverter device 22 for performing a control of the driving motor 6 in response to a command of the electric control unit 21. The electric control unit 21, the inverter device 22 and a brake controller 23 are all mounted on the vehicle body structure 1. The electric control unit 21 is comprised of a computer, a program executed by the computer, various electronic circuit or the like.

The electric control unit 21, when classified functionally, can be divided into a drive control unit 21a and a general control unit 21b. The drive control unit 21a generates an acceleration/deceleration command, which is to be applied to the driving motors 6 and 6 in the left and right wheels, from an acceleration command outputted from an accelerator operating unit 16, a deceleration command outputted from a brake operating unit 17 and a turn command outputted from the steering angle sensor 15 and outputs this command to the inverter device 22. The drive control unit 21a may however have, in addition to the above, a function of correcting the acceleration/deceleration command, outputted therefrom, with the use of information on the tire number of revolutions, which is obtained from a rotation sensor 24 provided in each of the wheel support bearing assemblies 4 and 5 in the vehicle wheels 2 and 3, and information from various vehicle mounted sensors. The accelerator operating unit 16 is comprised of an accelerator pedal and a sensor 16a capable of detecting the pedaling amount of the accelerator pedal and then outputting the acceleration command referred to previously. The brake operating unit 17 is comprised of a brake pedal and a sensor 17a capable of detecting the pedaling amount of the brake pedal and then outputting the deceleration command referred to previously.

The general control unit 21b of the electric control unit 21 has a function of outputting the deceleration command outputted from the brake operating unit 17 to the brake controller 23, a function of controlling various auxiliary equipment systems 25, a function of processing an input command from an operating panel 26 in a console, and a function of causing a display device 27 to make displays. The auxiliary equipment systems 25 referred to above includes, for example, an air conditioner, lights, wipers, a global positioning system (GPS), air bags and so on, and are shown collectively in one block here.

The brake controller 23 is a means for applying a braking command to any one of the brakes 9 and 10 of the front and rear vehicle wheels 2 and 3 in accordance with the deceleration command from ECU 21. The braking command outputted from the electric control unit 21 includes, in addition to a command generated in response to the deceleration command outputted from the brake operating unit 17, a command generated by means for improving the safety factor peculiar to the electric control unit 21. The brake controller 23 additionally have an anti-lock brake system. This brake controller 23 is comprised of an electronic circuit and a microcomputer or the like.

The inverter device 22 is comprised of a power circuit unit 28 provided for each of the motors 6 and a motor control unit 29 for controlling these power circuit units 28. It is, however, to be noted that the motor control unit 29 may be provided in common to each power circuit unit 28 or separately from each other, but even when it is provided in common to each power circuit unit 28, each power circuit unit 28 may be rendered to be independently controllable so that, for example, the motor torques may differ from each other. The motor control unit 29 has a function of outputting information (hereinafter referred to as "IWM system information") on various detection values, control values or the like associated with the in-wheel motor 8, which is possessed by the motor control unit 29, to the electric control unit 21.

Figure 2:
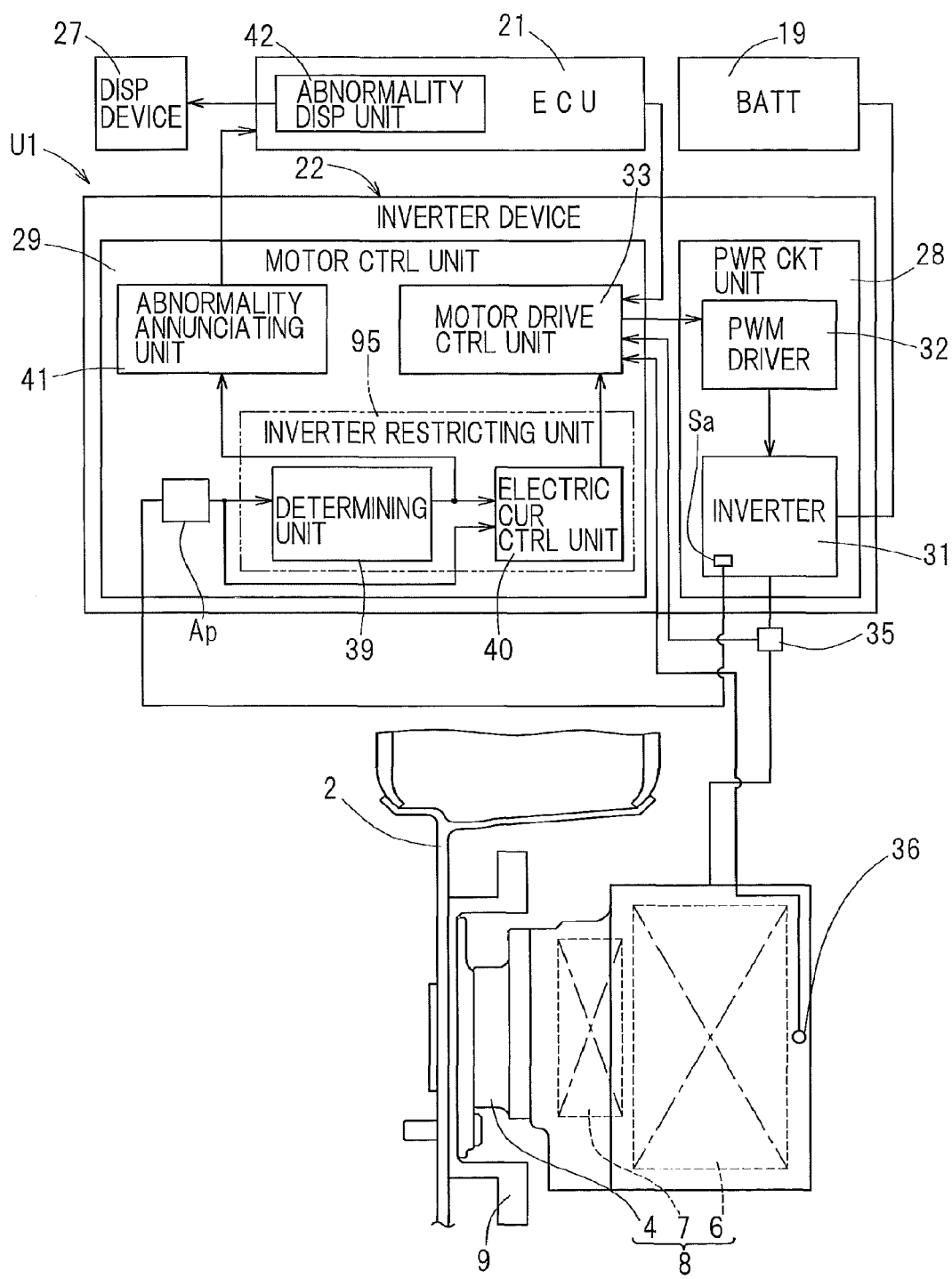
FIG. 2 is a block diagram showing a conception of the control device or the like for a drive motor employed in the electric automobile.

FIG. 2 illustrates a block diagram showing a conception of the control device and related devices for a drive motor employed in the electric automobile. The power circuit unit 28 is comprised of an inverter 31 for converting a direct current power of a battery 19 into a three phase alternating current power which is used in driving the motor 6, and a PWM driver 32 for controlling the inverter 31. The motor 6 is, for example, a three phase synchronous motor or the like. The inverter 31 is made up of a plurality of semiconductor switching elements 31a and the PWM driver 32 performs a pulse width modulation of an inputted current command to apply an ON-OFF command to each of the semiconductor switching elements 31a.

As shown in FIG. 2, the motor control unit 29 is comprised of a computer, a program, which is executed by the computer, and electronic circuits and has the motor drive control unit 33 as its underlying control unit. The motor drive control unit 33 is a unit for converting the acceleration/deceleration command such as a torque command or the like applied from the electric control unit, which is a host control unit, into the electric current command and then applying the electric current command to the PWM driver 32 in the power circuit unit 28. The motor drive control unit 33 performs an electric current feedback control when it acquires a motor current value to be fed from the inverter 31 to the motor 6 from an electric current detecting unit 35. Also, the motor drive control unit 33 performs a vector control when the angle of rotation of the rotor of the motor 6 is applied from the angle sensor 36.

In the embodiment now under discussion, the motor control unit 29 of the structure hereinabove described is provided with an inverter restricting unit 95 and an abnormality annunciating unit 41, and the electric control unit 21 is provided with an abnormality display unit 42. Also, the inverter 31 referred to above is provided with a temperature sensor Sa for detecting the temperature Tc of the inverter 31.

Figure 5A:
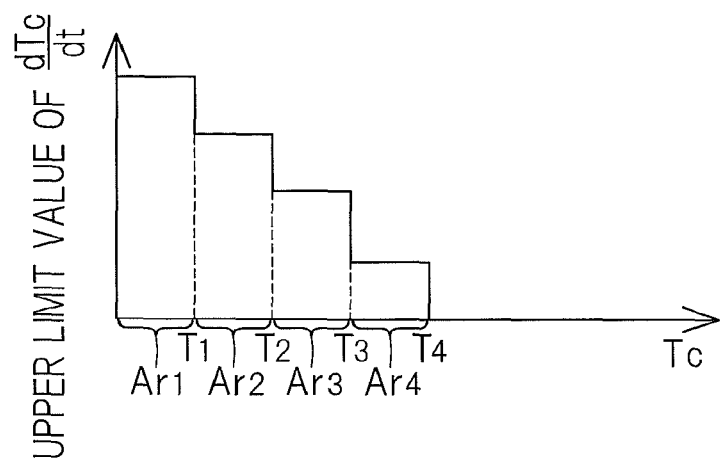
FIG. 5A is a chart showing the relation between an inverter temperature and an upper limit value of dTc/dt.

As shown in FIG. 2, the inverter restricting unit 95 is of a type operable to apply a restriction to a current command to be applied to the inverter 31 and includes a determining unit 39, as will be described later, and an electric current control unit 40. As shown in FIG. 5A, a plurality of threshold values, for example, four threshold values $T_1$, $T_2$, $T_3$ and $T_4$, are set up for the temperature Tc detected by the temperature sensor Sa shown in FIG. 2 and, for each of the temperature regions Ar1, Ar2, Ar4 and Ar4, which are sorted out by each of the threshold values $T_1$ to $T_4$, a different current restricting condition is set up. The electric current control unit 40 in the inverter restricting unit 95 applies a restriction to the electric current command to be applied to the inverter 31 in dependence on the current restricting condition of one of the temperature regions Ar1 to Ar4, in which the detected temperature Tc is included. The electric current restricting condition in this example lies in providing the upper limit value (permissible upper limit) to a time dependent change dTc/dt of the inverter temperature which the time t is differentiated by the temperature Tc. As the electric current restricting condition, for every temperature region Ar1 to Ar4 so sorted out, the permissible upper limit of dTc/dt is set up. A detection value detected by the temperature sensor Sa is amplified by an amplifier Ap. Restriction of the time dependent change dTc/dt of the inverter temperature by the electric current control unit 40 can be accomplished by monitoring dTc/dt at all times by means of a value inputted from the amplifier Ap.

More specifically, at the stage that the temperature Tc lower than or equal to $T_1$ is detected, the threshold value $T_1$ on a lower temperature side is set up as the threshold value. The upper limit value of dTc/dt within the temperature region Ar1, in which the temperature Tc which has been detected is included, is set up. At the stage that the temperature Tc higher than $T_1$, but lower than or equal to $T_2$ is detected, a threshold value $T_2$, which is higher than the threshold value $T_1$, but lower than or equal to the threshold value $T_3$, is set up. The upper limit value of dTc/dt within the temperature region Ar2, in which the temperature Tc which has been detected is included, is set up lower than the upper limit value of dTc/dt in the temperature region Ar1. In this way, the inverter restricting unit 95 is so designed as to change the permissible upper limit value of dTc/dt in accordance with the divided temperature regions Ar1 to Ar4, when the time dependent change dTc/dt of the inverter temperature is positive.

Figure 5B:
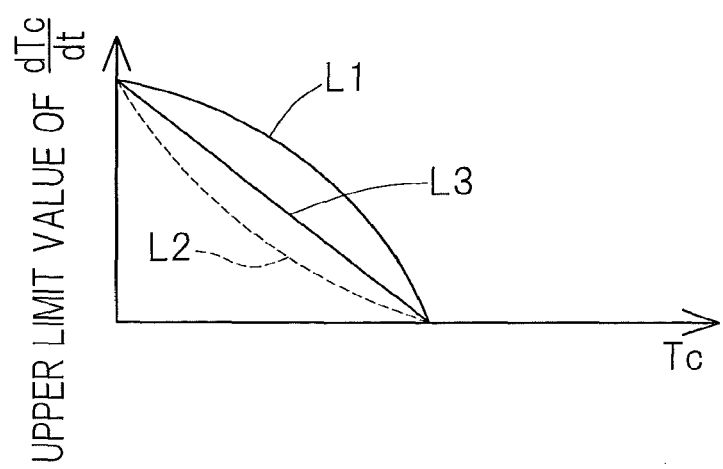
FIG. 5B is a chart showing the relation between the inverter temperature and the upper limit value of dTc/dt when a temperature region sorted out by each threshold value is finely sorted out.

In the example shown in FIG. 5A, the inverter restricting unit 95 sets up the upper limit value of the time dependent change dTc/dt of the inverter temperature so as to stepwise decrease from a low temperature side towards a high temperature side for each of the temperature region Ar1 to Ar4 in which the detected temperature Tc is included. It is to be noted that, as shown in FIG. 5B, the temperature regions divided by each of the threshold values are more finely divided, and the upper limit value of dTc/dt may be quadratically gradually decreased towards the high temperature side so that the upper limit value of dTc/dt may represents an upwardly convex shape as shown by a curve L1 or may be quadratically decreased so that the upper limit value of dTc/dt may represents a downwardly convex shape as shown by a curve L2. Also, as shown in a straight line L3, the upper limit value of dTc/dt may be linearly decreased towards the high temperature side. In those cases, the temperature control of the inverter 31 can be further meticulously accomplished as compared with that shown in FIG. 5A. If the upper limit value of dTc/dt is set up as shown by the solid lined curve L1, since it becomes easy to permit the inverter temperature Tc to steeply increase to the temperature Tc on the high temperature side, it becomes easy for the electric current control unit 40 to perform an electric current control free from any deterrent in operation.

Figure 3:
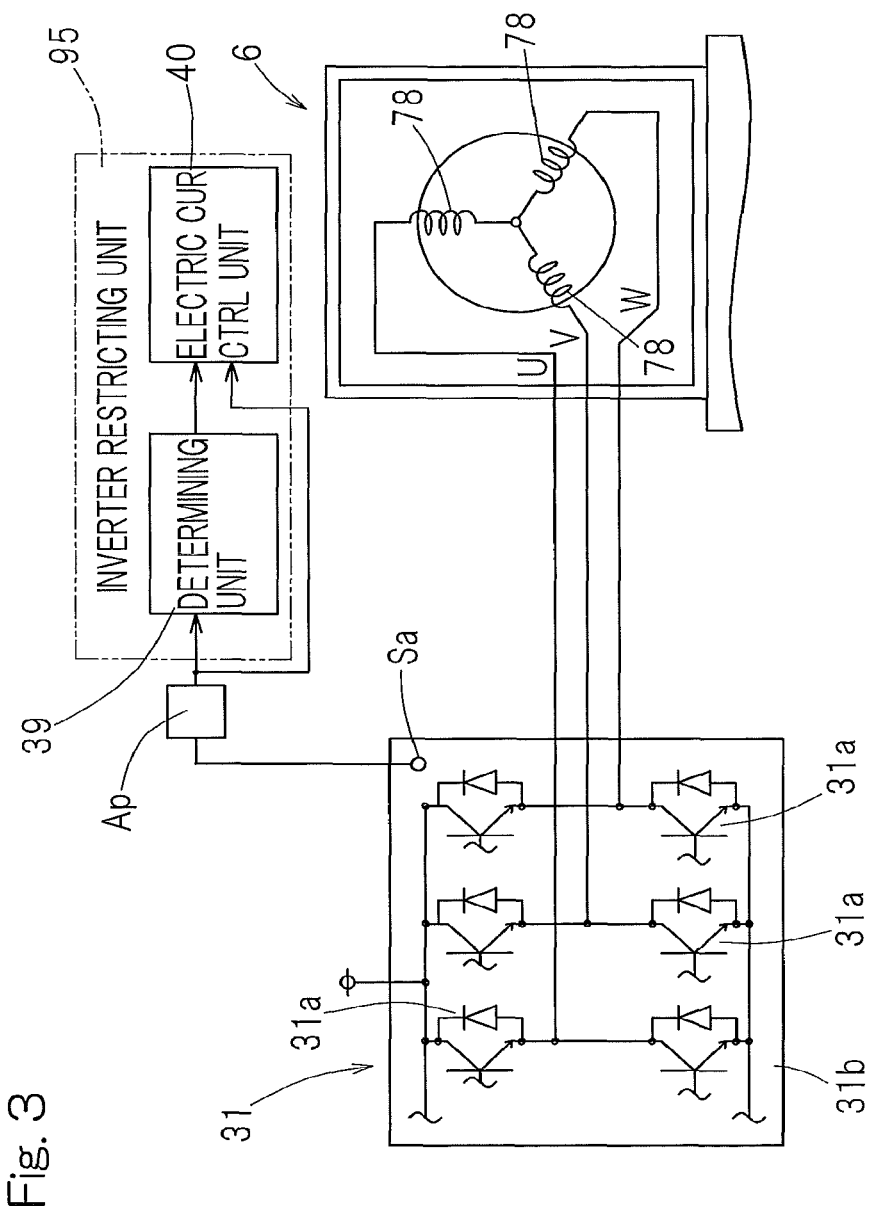
FIG. 3 is a block diagram showing a conception of an inverter employed in the electric automobile.

For the temperature sensor Sa, a thermistor, for example, is employed. If this thermistor is fixed on a substrate 31b, where the plurality of the semiconductor switching elements 31a are surface mounted as shown in FIG. 3, the temperature Tc of the inverter 31 can be detected. It is however to be noted that the thermistor may be fixed on the semiconductor switching elements 31a directly. In this example, as shown in FIGS. 2 and 4, a detection value detected by the thermistor is amplified by the amplifier Ap and this amplified value is determined by the determining unit 39.

The determining unit 39 determines at all time whether or not the temperature Tc detected by the temperature sensor Sa exceeds the upper limit value of the temperature region in which the temperature Tc detected by the temperature sensor Sa is included. Namely, whether or not Tc exceeds each of the threshold value $T_1$ to $T_4$ is determined. Along therewith, the determining unit 39 determined at all times also whether or not the time dependent change dTc/dt of the inverter temperature exceeds the upper limit value of the temperature region in which the detected temperature Tc is included. Each of the threshold values $T_1$ to $T_4$ may be sorted out in dependence on, for example, the number of the threshold values $T_1$ to $T_4$ while an operating warranty temperature of the semiconductor switching element 31a used here is given a margin, or may be suitably determined on the basis of the relationship between the temperature of the inverter 31 and time which temperature will cause a characteristic change in the inverter 31, obtained by the experiment, simulation and so on. The determined threshold values are rewritably stored in a storage unit (not shown) as a table.

Figure 4:
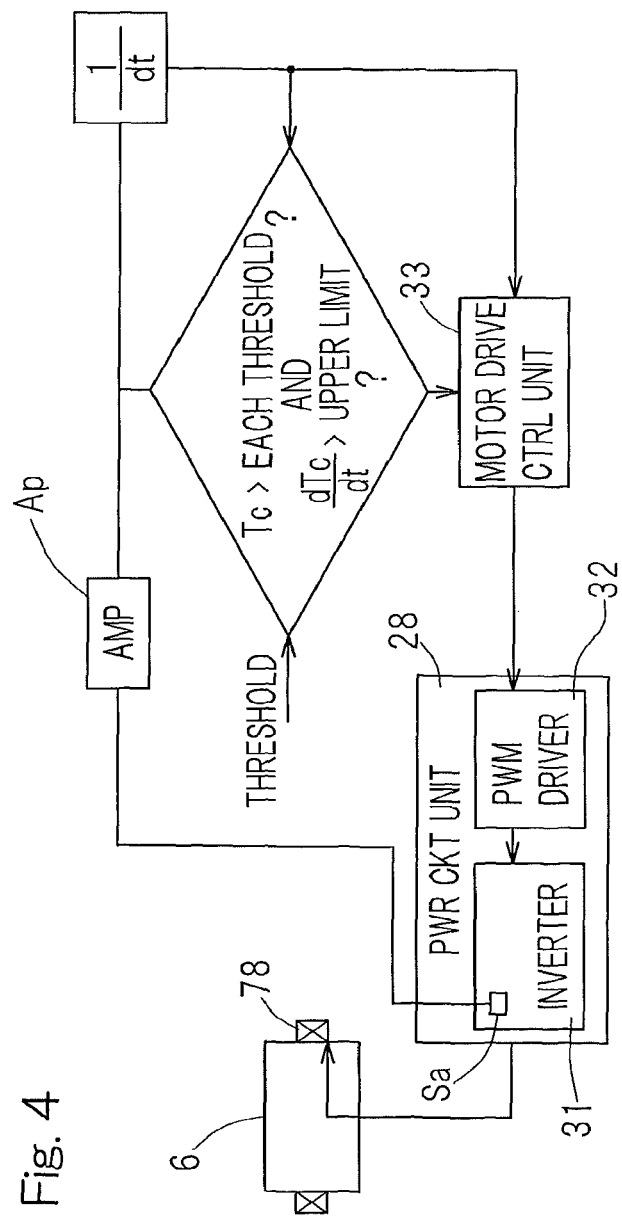
FIG. 4 is a block diagram showing a control system employed in the electric automobile.

As shown in FIGS. 2 and 4, when the detected temperature Tc of the inverter 31 is determined by the determining unit 39 as exceeding each of the threshold values defined in the temperature region in which the detected temperature Tc is included, and when dTc/dt is determined as exceeding the upper limit value of the temperature region in which the detected temperature Tc is included, the electric current control unit 40 applies a command to the power circuit unit 28 through the motor drive control unit 33 so as to restrict the electric current command applied to the inverter 31. The motor drive control unit 33 applies the electric current command to the PWM driver 32 after it has been converted into the electric current command in response to the acceleration/deceleration command from the electric control unit 21, but it applies a restriction to the electric current command referred to above in response to the command from the electric current control unit 40.

More specifically, the electric current control unit 40 performs a control of changing one or both of the duty ratio and the number of pulses. By way of example, by reducing the duty ratio, representative of the ON time of a pulse relative to the switching cycle or a time of one switching cycle, by a few tens % of the preset duty ratio cut in order to lower the voltage effective value or by generating pulses of an uneven width while the switching cycle is set to the same cycle, a restriction is applied to the electric current commend which is applied to the inverter 31. By so doing, the time dependent change dTC/dt of the inverter temperature exhibits a tendency of being constant or being lowered.

When the tendency of the dTc/dt in that way is recognized, that is, when the time dependent change dTc/dt of the inverter temperature is 0 or smaller, the electric current restriction to the inverter 31 is released without waiting for the reduction of the actual temperature Tc. Because of that, the sudden drive restriction of the motor 6 can be avoided without allowing the motor current to be lowered too much. Lowering of dTc/dt down to zero or lower is synonymous to the inclination of the temperature Tc during an arbitrary minute time getting zero or lower. If the temperature of the inverter 31 does not decrease suddenly and, if the electric current command to the inverter 31 is restricted by the time the temperature decreases to a certain extent, and the motor current is reduced, the drivability of the automobile will be hampered by the sudden drive restriction of the motor 6. But, as described above, since the electric current restriction to the inverter 31 is released when the incipiency of the above described temperature decrease is caught, the problem associated with the sudden drive restriction of the motor 6 can be avoided because the restriction of the motor current to be supplied to the motor 6 is released.

Even though the temperature Tc of the inverter 31 starts increasing as a result of the restriction release of the inverter restricting unit 95, if the detected temperature Tc at that time is a temperature higher than the threshold value within the temperature range in which this temperature Tc is included, and if dTc/dt exceeds the upper limit value of the temperature region, in which the temperature Tc to be detected is included, a control to restrict the electric current command to the inverter 31 is again implemented. For this reason, when the time dependent change dTc/dt of the inverter temperature attains a value no higher than 0, it is possible to assuredly prevent an excessive loading even if the control to restrict the electric current command to the inverter 31 is released. Accordingly, while any impairment or the like resulting from a superheating of the inverter 31 is prevented, not only the change in control characteristic of the motor drive but also incapability of the motor drive can be avoided. More specifically, FIGS. 6A and 6B illustrate respective charts showing the relation between the temperature Tc of the inverter 31 in the electric automobile and time t.

Figure 6A:
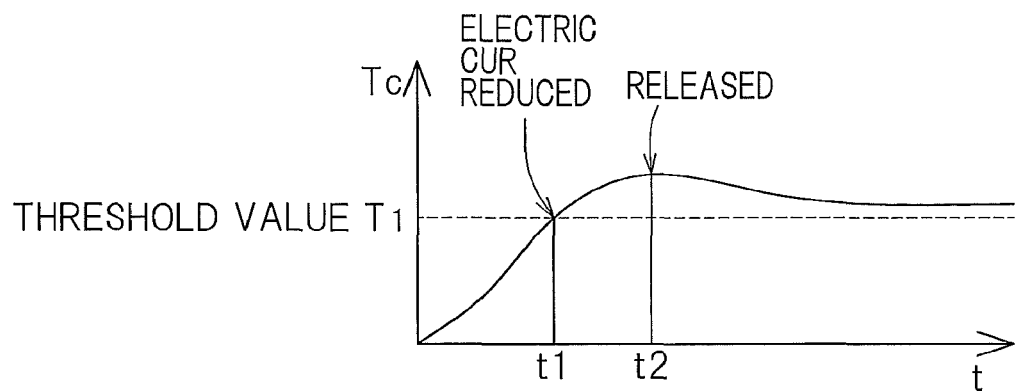
FIG. 6A is a chart showing the relation between the inverter temperature of an inverter device, employed in the electric automobile, and time.

In FIG. 6A, when the temperature Tc of the inverter 31 increases and is at the timing t1, the determining unit 39 determines that the temperature Tc of the inverter 31 exceeds the threshold value $T_1$ and dTc/dt exceeds the upper limit value. The electric current control unit 40, in response to the result of this determination, commands the power circuit unit 28 through the motor drive control unit 33 so that the electric current command to the inverter 31 can be restricted. The motor drive control unit 33 applies the electric current command to the PWM driver 32 in the power circuit unit 28 in accordance with the command given from the electric current control unit 40. The power circuit unit 28 reduces the electric current to be supplied to the motor 6.

When dTc/dt becomes zero (the temperature Tc being constant) at the timing t2, the electric current control unit 40 releases the control to restrict the electric current command to the inverter 31. In the example as shown in FIG. 6A, dTc/dt becomes minus (the temperature Tc is lowered) after the timing t2, even though the inverter temperature Tc is equal to or higher than the threshold value $T_1$, the electric current control unit 40, without waiting for the actual temperature Tc being lowered, continues releasing the control to restrict the electric current command.

Figure 6B:
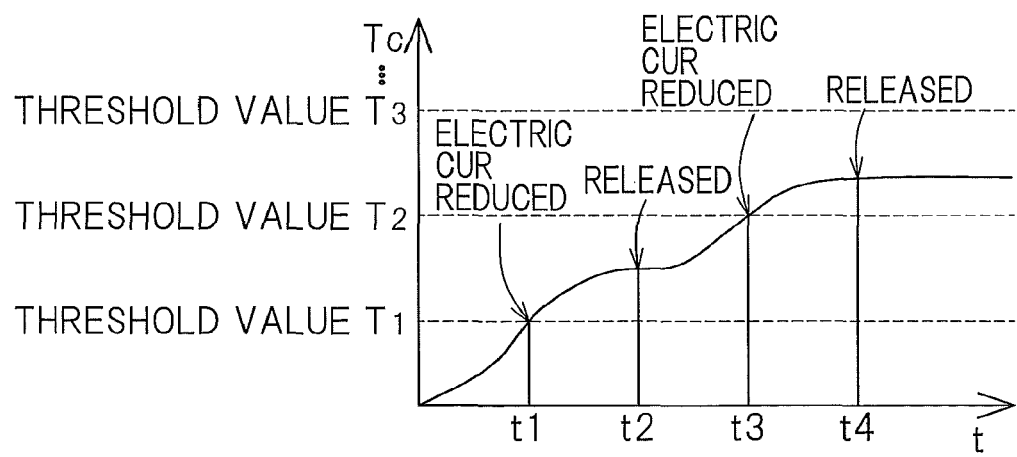
FIG. 6B is a chart showing the relation between the inverter temperature of an inverter device, employed in the electric automobile, and time.

In the example shown in FIG. 6B, at the timing t1, the electric current control unit 40 commands the power circuit unit 28 through the motor drive control unit 33 to restrict the electric current command to the inverter 31 in response to a result of determination by the determining unit 39. After the timing t2, as a result of the control release of the inverter restricting unit 95, the temperature Tc of the inverter 31 again increases and, at the timing t3, the determining unit 39 determines that the temperature Tc of the inverter 31 exceeds the threshold value $T_2$ and dTc/dt exceeds the upper limit value. The electric current control unit 40, in response to this result of decision, commands the power circuit unit 28 through the motor drive control unit 33 so that the electric current command to the inverter 31 may be restricted in a manner similar to that described above. When dTc/dt becomes zero (the temperature is constant) at the timing t4, the electric current unit 40 releases the electric current restriction to the inverter 31.

In the example of this FIG. 6B, since dTc/dt is zero after the timing t4, even though the temperature Tc exceeds the threshold value $T_2$, the electric current control unit 40, without waiting for the actual temperature Tc to decrease, continues releasing the release of the electric current restriction to the inverter 31. It is to be noted that, if the temperature Tc of the inverter 31 starts increasing again as a result of the control release of the inverter restricting unit 95, the electric current control unit 40 performs a control to restrict the electric current command to the inverter 31 on the basis of the determination with the next threshold value $T_3$ and the result of determination with dTc/dt.

Even in any of the examples shown respectively in FIGS. 6A and 6B, if the inverter restricting unit 95 performs the control to restrict the electric current command to the inverter 31, the time dependent change dTc/dt of the inverter temperature Tc demonstrate a tendency of being constant or decreasing. When such a tendency of dTc/dt is recognized, that is, when the time dependent change dTc/dt of the inverter temperature Tc becomes zero or lower, without waiting for the actual temperature Tc being lowered, the electric current restriction to the inverter 31 is released. For this reason, the sudden drive restriction of the motor 6 is avoided without the motor current being too much lowered. Even though the inverter temperature Tc starts increasing as a result of the control release of the inverter restricting unit 95, the control to restrict the electric current command to the inverter 31 is again implemented if, at that time, the temperature Tc to be detected is higher than the threshold value within the temperature region in which this temperature Tc is included and dTc/dt exceeds the upper limit value of the temperature region in which the temperature Tc to be detected is included.

As shown in FIG. 2, the abnormality annunciating unit 41 is a unit to output an abnormality occurring information to the electric control unit 21 in the event that the determining unit 39 determines that the temperature Tc exceeds a predetermined threshold value (for example, $T_2$) among the plurality of the threshold values. The abnormality display unit 42 provided in the electric control unit 21 operates, in response to the abnormality occurring information of the inverter 31 outputted from the abnormality annunciating unit 41, to cause the display device 27 in the driver's seat to annunciate the occurrence of an abnormality. The display on the display device 27 is rendered to be a display of alphanumeric character and/or symbols, for example, icons.

Functions and effects will now be described with reference to FIG. 2. According to the construction described above, the temperature sensor Sa detects the temperature Tc of the inverter 31 at all times. For example, where the electric automobile is driven continuously under a high torque generating condition such as during the run on a sloping road, the temperature Tc of the inverter 31 increases and, at the same time, the temperature of a motor coil 78 shown in FIG. 7 increases. The temperature detection of the inverter 31 by the temperature sensor Sa is poor in response, the plurality of threshold value are set up for the temperature Tc and electric current restricting conditions, which are different from each other, are set up for each of the temperature regions that are sorted out by each threshold value. In other words, when the detected temperature Tc is relatively low, the electric current restricting condition is eased, that is, the upper limit value of dTc/dt is increased and, on the other hand, the higher the detected temperature Tc is, the more strictly the electric current restricting condition is regulated, that is, the higher the upper limit value of dTc/dt is employed.

The inverter restricting unit 95 performs a control to apply a restriction to the electric current command to be applied to the inverter 31 in dependence on the electric current restricting condition of the temperature region in which the detected temperature Tc is included. For example, by reducing the duty ratio, which is descriptive of the ON time of the pulse relative to the switching cycle, down to a value smaller than the preset duty ratio to thereby lower the electric voltage effective value and by generating the uneven width pulse while the switching cycle is set to the sake cycle, a restriction can be applied to the electric current command to be applied to the inverter 31. With the restriction applied to the electric current command to be applied to the inverter 31 in this way, the temperature control of the inverter 31 can be meticulously accomplished and any characteristic change, impairment and reduction of the life of the inverter 31 can be avoided. Accordingly, deterioration of the insulating performance of the motor coil 78 shown in FIG. 7 can be prevented and the motor 6 can be prevented from falling into the driving incapability, and, therefore, it is possible to avoid that the driving of the automobile may be suddenly disturbed.

The inverter restricting unit 95 is rendered to be of a type capable of changing the permissible upper limit of the time dependent change dTc/dt of the inverter temperature, in which the temperature Tc is differentiated by time t, in dependence on each of the sorted temperature regions when the time dependent change dTc/dt of the inverter temperature is positive. By changing the permissible upper limit of the time dependent change dTc/dt of the inverter temperature in dependence on each of the sorted temperature regions mentioned above, the meticulous temperature control of the inverter 31 can be accomplished. By way of example, when the detected temperature Tc is relatively low, even though the extent of change of the temperature Tc is steep, there is no possibility that the inverter 31 may be immediately impaired and, therefore, the permissible upper limit of dTc/dt is relieved. Conversely, if the detected temperature Tc becomes high, even though the extent of change of the temperature Tc is slow, it leads to a change in characteristic of the inverter 31, impairment of the inverter 31 and/or reduction in life of the inverter 31. Accordingly, in dependence on each of the divided temperature regions, by changing the permissible upper limit of the time dependent change dTc/dt of the inverter temperature to accomplish the temperature control of the inverter 31, the impairment or the like of the inverter 31 can be avoided.

Also, by setting the permissible upper limit of dTc/dt so as to decrease from the low temperature side towards the high temperature side for every temperature region in which the detected temperature Tc is included, the inverter 31 can be easily and accurately controlled as to its temperature. In other words, when the inverter temperature Tc is low, since there is no possibility of the semiconductor switching elements 31a being damaged or otherwise impaired, an abrupt increase of the temperature Tc is permitted even though the response to a temperature detection is poor. On the other hand, when the inverter temperature Tc is high, since the semiconductor switching elements 31a may be easily damaged or otherwise impaired, a strong restriction is made so that an abrupt increase of the temperature Tc may not occur. The temperature regions divided by each of the threshold value may be finely divided to linearly decrease the permissible upper limit of dTc/dt towards the high temperature side. In such case, the temperature control of the inverter 31 can be further meticulously performed.

Since the inverter restricting unit 95 is provided in the motor control unit 29 of the inverter device 22 and the determination or the like of the detected temperature can be performed at a site proximate to the motor 6, it is advantageous in terms of wiring and a quick control can be performed in comparison with that provided in the electric control unit 21 and the problem associated with the roadability of the automobile can be readily avoided. Also, the loading on the electric control unit 21 which is getting complicated as a result of being designed to have a high functionality can be relieved.

Since the electric control unit 21 is a device for integrally controlling the entire electric automobile, by the inverter control unit 95 in the inverter device 22, when the temperature abnormality of the inverter 31 is detected, a proper control of the automobile as a whole can be performed by the electric control unit 21 by outputting the abnormality annunciation of the inverter 31 to the electric control unit 21. Also, the electric control unit 21 is a host control unit for applying a command of driving to the inverter device 22 and, after a temporary control by the inverter device 22, a proper driving control subsequent thereto can be performed by the electric control unit 21.

Figure 7:
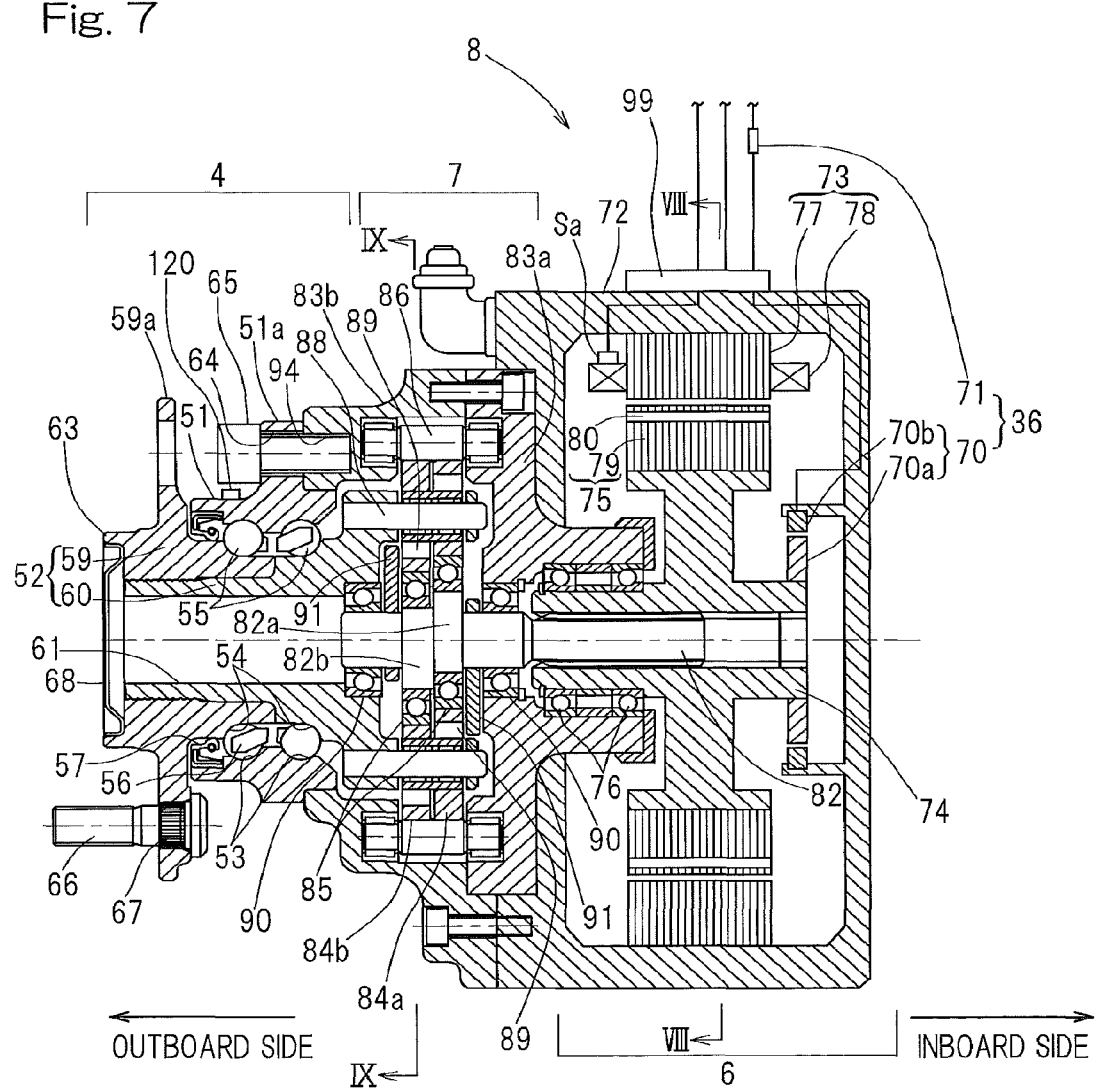
FIG. 7 is a longitudinal sectional view showing an in-wheel motor drive device employed in the electric automobile.

As shown in FIG. 7 showing one example, the in-wheel motor drive device 8 is of a structure in which the reduction gear 7 is interposed between the wheel support bearing unit 4 and the motor 6, and in which the hub of the driving wheel 2 (FIG. 2) supported by the wheel support bearing unit 4 and the rotary output shaft 74 of the motor 6 (FIG. 7) are connected coaxially with each other. The reduction gear 7 is preferably of a type having a speed reducing ratio of 4 or more. This reduction gear 7 is a cycloid reduction gear of a structure in which eccentric portions 82a and 82b are formed in the rotary input shaft 82, which is coaxially connected with the rotary output shaft 74 of the motor 6 and curved plates 84a and 84b are mounted respectively on the eccentric portions 82a and 82b through associated bearings 85 so that eccentric motions of those curved plates 84a and 84b can be transmitted as a rotary motion to the wheel support bearing unit 4. It is to be noted that, hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

The wheel support bearing unit 4 includes an outer member 51 having its inner periphery formed with a plurality of rows of rolling surfaces 53, an inner member 52 having its outer periphery formed with rolling surfaces 54 held in relation with the respective rolling surfaces 53, and a plurality of rows of rolling elements 55 interposed between the rolling surfaces 53 in the outer member 51 and the rolling surfaces 54 in the inner member 52. The inner member 52 concurrently serves as a hub for the support of the driving wheel. This wheel support bearing unit 4 is rendered to be a double row angular contact ball bearing and the rolling elements 55 used therein are in the form of balls that are retained by a retainer 56 used for each row. The rolling surfaces 53 and 54 have an arc sectional shape and those rolling surfaces 53 and 54 have contact angles that is held in back-to-back relation to each other. A bearing space delimited between the outer member 51 and the inner member 52 has one end on the outboard side that is sealed by a sealing member 57.

The outer member 51 is the one which will become a stationary side raceway ring and is of one piece construction as a whole including a flange 51a formed therein for connection with a housing 83b on the outboard side of the reduction gear 7. The flange 51a is provided with a bolt insertion hole 64 defined at a plurality of circumferential locations thereof. Also, the housing 83b is provided with an internally threaded bolt screwing hole 94 defined at a location thereof that aligns with each of the locations where the bolt insertion hole 64 is defined. Accordingly, when mounting bolts 65 inserted through the bolt screwing holes 94 are firmly threaded into the corresponding bolt screwing holes 94, the outer member 51 can be fitted to the housing 83b.

The inner member 52 is the one which will become a rotatable side raceway ring and includes an outboard side member 59 having a wheel mounting hub flange 59a, and an inboard side member 60 integrated with the outboard side member 59 by means of a crimped area where the outboard side is fit with an inner periphery of the outboard side member 59. The rows of the rolling surfaces 54 referred to previously are formed in the outboard side member 59 and the inboard side member 60, respectively. The inboard side member 60 has a center portion formed with a center bore or a through hole 61 defined therein. The hub flange 59a has a press fitting hole 67 defined at a plurality of circumferential locations thereof for receiving a corresponding hub bolt 66. In the vicinity of a root portion of the hub flange 59a in the outboard side member 59, a cylindrical pilot portion 63 for guiding the driving wheel and a brake component (not shown) protrude towards the outboard side. This pilot portion 63 has an inner periphery provided with a cap 68 for closing that end on the outboard side of the center bore 61.

The motor 6 referred to previously is an interior permanent magnet synchronous motor (that is, IPM motor) of a radial gap type in which a radial gap is defined between a motor stator 73, which is fixed to a cylindrical motor housing 72, and a motor rotor 75, fitted to a rotary output shaft 74. The rotary output shaft 74 is supported in a cantilevered fashion by a cylindrical portion of the housing 83a on the inboard side of the reduction gear 7 through two bearings 76.

Figure 8:
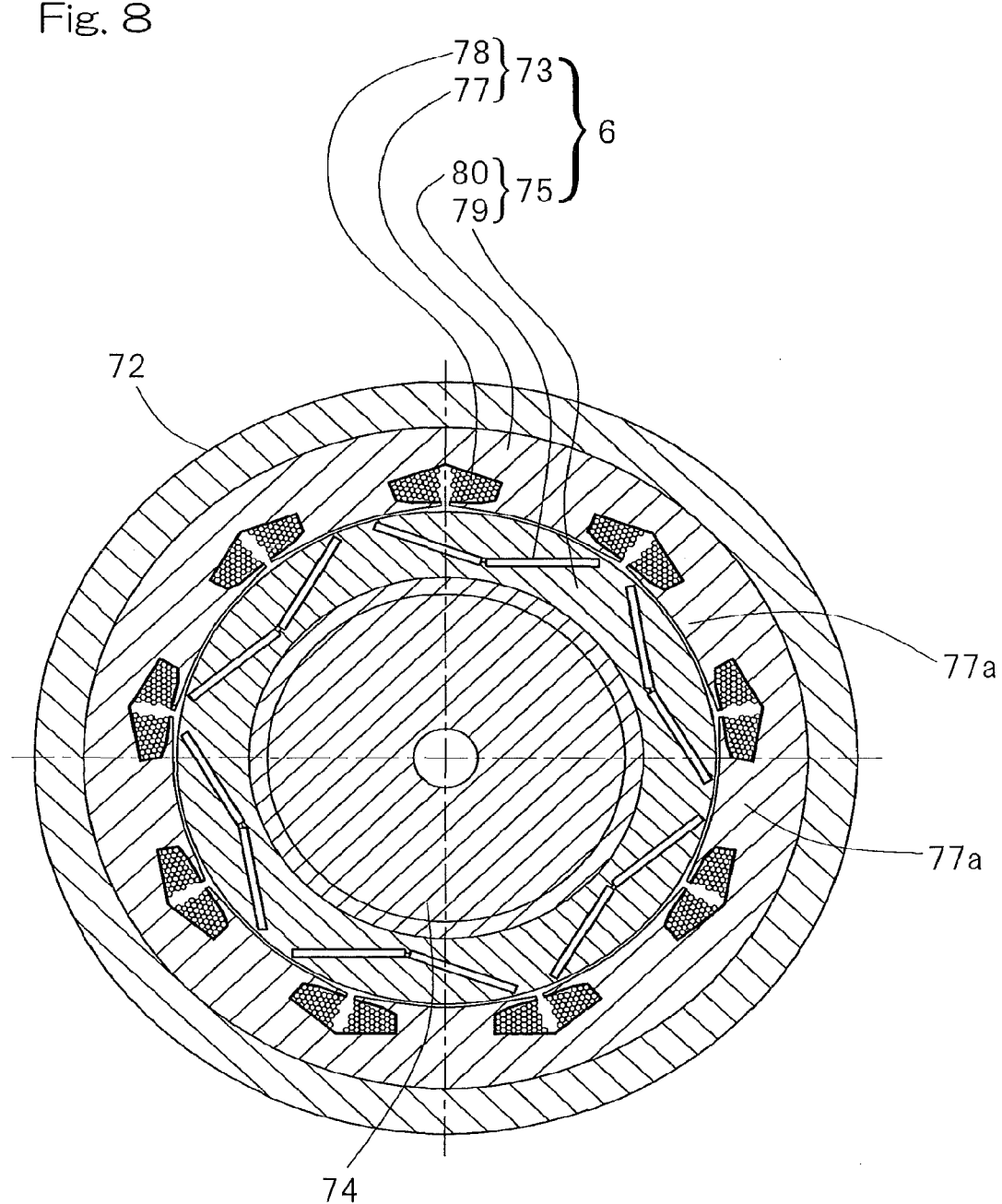
FIG. 8 is a cross sectional view taken along the line VIII-VIII in FIG. 7, showing a motor portion.

FIG. 8 illustrates the section of the motor (a cross sectional view taken along the line VIII-VIII in FIG. 7). The motor rotor 75 of the motor 6 is made up of a core portion 79 made of a soft magnetic material and a permanent magnet 80 built in the core portion 79. The permanent magnet 80 is of a structure in which neighboring two permanent magnets are arranged in a V sectioned shape on the same circumference within the rotor core portion 79 so as to face with each other. The permanent magnet 80 is employed in the form of a neodymium magnet. The stator 73 is made up of a core portion 77, made of a soft magnetic material, and a coil 78. The core portion 77 has its outer peripheral surface which is a ring shape having a circular sectional shape, and a plurality of teeth 77a each protruding towards an inner diametric side, are formed in an inner peripheral surface of the core portion 77 in a row extending in a circumferential direction thereof. The coil 78 is wound around each of the teeth 77a which forms a projecting pole of the stator core portion 77.

As shown in FIG. 7, the motor 6 is provided with an angle sensor 36 for detecting the angle of a relative rotation between the motor stator 73 and the motor rotor 75. This angle sensor 36 includes an angle sensor main body 70, for detecting and outputting a signal indicative of the angle of the relative rotation between the motor stator 73 and the motor rotor 75, and an angle calculation circuit 71 for calculating the angle from a signal outputted from the angle sensor main body 70. The angle sensor main body 70 is made up of a to-be-detected portion 70a, provided in an outer peripheral surface of the rotary output shaft 74, and a detecting portion 70b provided in the motor housing 72 in the vicinity of the to-be-detected portion 70a disposed so as to face the to-be-detected portion 70a in a direction, for example, radially thereof. It is, however, to be noted that the to-be-detected portion 70a and the detecting portion 70b may be disposed in the vicinity of each other so as to confront each other in a direction axially thereof and that the angle sensor 36 may be employed in the form of a resolver. In this motor 6, the timing of application of each phase of each wave of an alternating current supplied to the coil 78 of the motor stator 73 is controlled by the motor drive control unit 33 of the motor control unit 29 on the basis of the detected angle of the relative rotation between the motor stator 73 and the motor rotor 75 by the angle sensor 36 in order to maximize the efficiency. It is to be noted that a wiring for the electric motor current of the in-wheel motor drive device 8 and wirings for various sensor systems and command systems are collectively bundled by a connector 99 provided in the motor housing 72 or the like.

Figure 9:
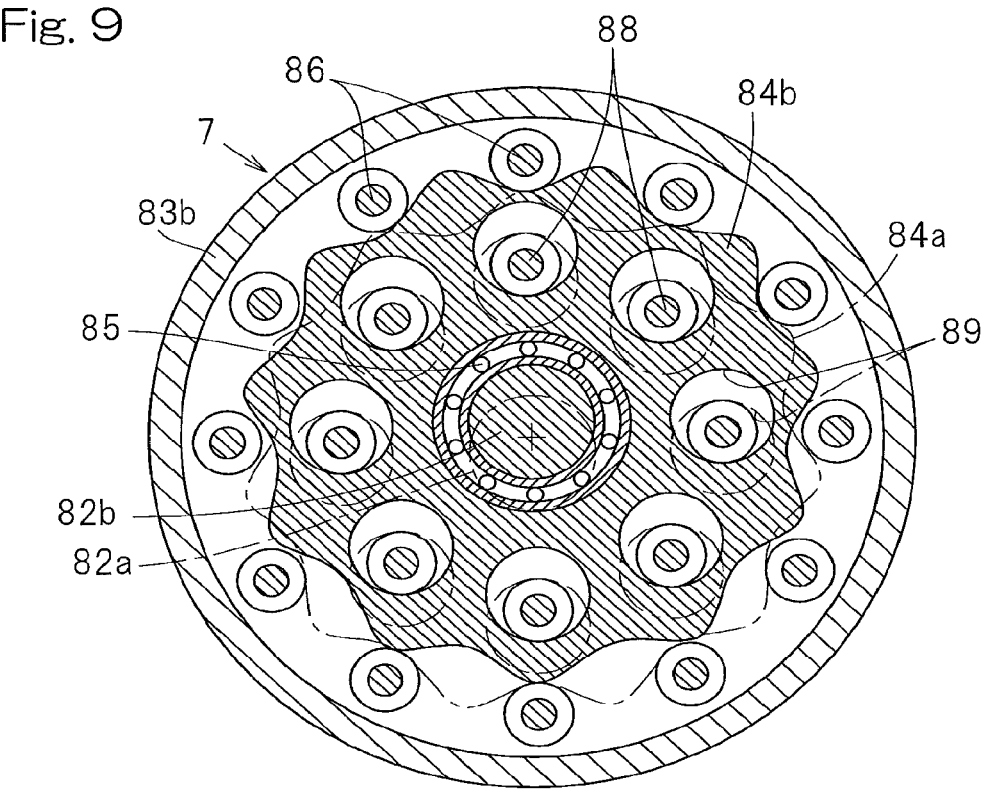
FIG. 9 is a cross sectional view taken along the line IX-IX in FIG. 7, showing a reduction gear portion.

The reduction gear 7 is in the form of the cycloid reduction gear as hereinbefore described and is of a structure in which, as shown in FIG. 9, the two curved plates 84a and 84b, each having such a outer shape as to represents a wavy trochoidal curve, are mounted on the respective eccentric portions 82a and 82b of the rotary input shaft 82 through associated bearings 85. A plurality of outer pins 86 for guiding respective eccentric motions of those curved plates 84a and 84b on an outer peripheral side are provided in the housing 83b so as to traverse the latter and a plurality of inner pins 88 fitted to the inboard side member 60 of the inner member 2 are engaged having been inserted into a plurality of round throughholes 89 defined within the curved plates 84a and 84b. The rotary input shaft 82 is splined to the rotary output shaft 74 of the motor 6 and is accordingly rotatable together with such rotary output shaft 74. It is to be noted that the rotary input shaft 82 is supported by the housing 83a on the inboard side and an inner diametric surface of the inboard side member 60 of the inner member 52 through two spaced bearings 90.

When the rotary output shaft 74 of the motor 6 rotates, the curved plates 84a and 84b mounted on the rotary input shaft 82 rotatable together with the rotary output shaft 74 undergo the respective eccentric motions. The eccentric motions of those curved plates 84a and 84b are transmitted to the inner member 52 as a rotary motion by means of the engagement between the inner pins 88 and the throughholes 89. The rotation of the inner member 52 takes place at a speed reduced relative to the rotation of the rotary output shaft 74 accordingly. By way of example, the speed reducing ratio of 10 or high can be obtained with a single stage cycloid reduction gear.

The two curved plates 84a and 84b are mounted on the respective eccentric portions 82a and 82b of the rotary input shaft 82 in a 180° phase displaced relation to each other so that the respective eccentric motions can be counterbalanced with each other. Further, in order to counterbalance, fluctuations caused by the eccentric motions of the curved plates 84a and 84b with each other, two counter weights 91 are mounted on the both sides of the eccentric portions 82a, 82b in a fashion radially offset relative to the direction of eccentricity of the adjacent eccentric portions 82a and 82b.

Figure 10:
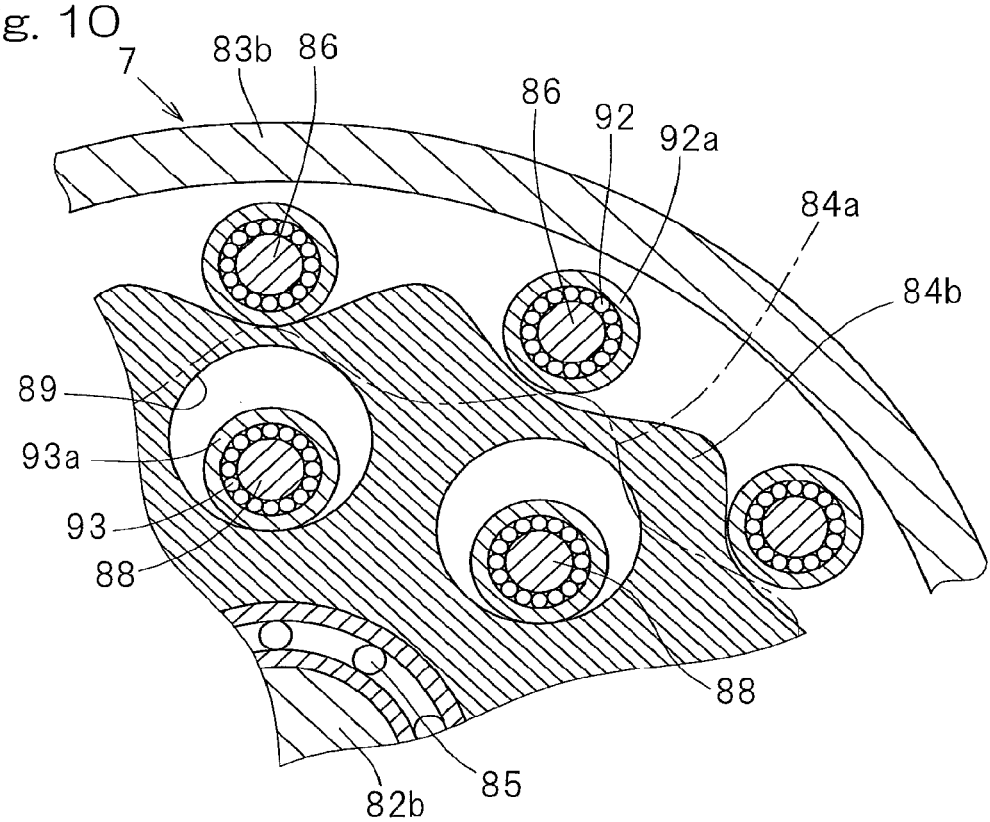
FIG. 10 is a fragmentary sectional view showing a portion of the reduction gear portion shown in FIG. 9.

As shown on an enlarged scale in FIG. 10, each of the outer pins 86 and each of the inner pins 88 have respective bearings 92 and 93 mounted thereon and outer rings 92a and 93a of those bearings 92 and 93 are held in rolling contact with the outer peripheries of the curved plates 94a and 94b and an inner periphery of the associated throughhole 89, respectively. Accordingly, while the contact resistance between each of the outer pins 86 and the outer periphery of any one of the curved plates 84a and 84b and the contact resistance between each of the inner pins 88 and the inner periphery of any one of the throughholes 89 are reduced, the respective eccentric motions of the curved plates 84a and 84b can be smoothly transmitted as a rotary motion to the inner member 52.

Referring to FIG. 7, the wheel support bearing unit 4 employed in the in-wheel motor drive device 8 is fixed to the automobile body structure at an outer peripheral portion of the housing 72 of the motor 6 or the housing 83b of the reduction gear 7 through an automobile suspension system (not shown) of a knuckle or the like (not shown).

Figure 11:
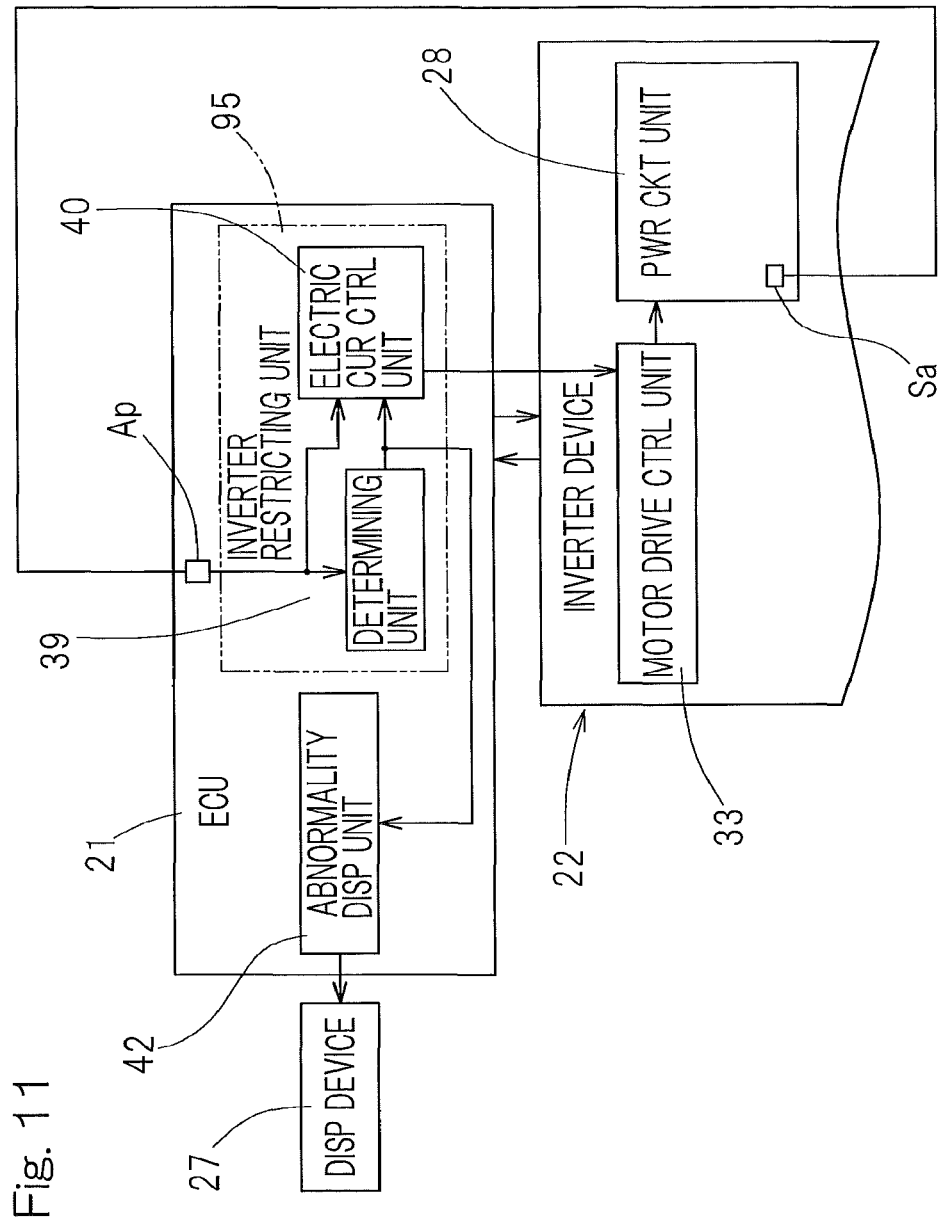
FIG. 11 is a block diagram showing a conception of an electric control unit (ECU) employed in the electric automobile designed in accordance with another preferred embodiment of the present invention.

In the case of the in-wheel motor drive device 8, as a result of compactization, the wheel support bearing unit 4, the reduction gear 7 and the motor 6 come to require reduction of the respective materials used and a high speed design of the motor 6 and, therefore, those reliability securement is a major concern. In particular when the temperature of the inverter 31 is detected and when the abnormality caused by overheating of the inverter 31, for example, thermal runaway or the like resulting from overheating of the semiconductor switching elements 31a are monitored at all times, the control to properly restrict the electric current command to be applied to the inverter 31 can be accomplished.

Where the reduction gear 7 employed in the in-wheel motor drive device 8 is employed in the form of the cycloid reduction gear and the speed reducing ratio is made equal to or higher than 4, compactization of the motor 6 and compactization of the device can be promoted. Where the speed reducing ratio is made high, the motor 6 is used in the form of the one capable of a high speed rotation. When the motor 6 is under a high speed rotation, since the change in characteristic of the inverter 31 and impairment of the inverter 31 are prevented, and since any change in control characteristic of the motor drive and incapability of the motor drive can be avoided, an undesirable sudden run of the automobile can be avoided. As shown in FIG. 11, the inverter restricting unit 95 may be provided in the electric control unit 21 which is an electric control unit for controlling the entire automobile.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

2 . . . Wheel
4 . . . Wheel support bearing unit
6 . . . Motor
7 . . . Reduction gear 8 ... In-wheel motor drive device
21 ... Electric control unit (ECU)
39 ... Determining unit
40 ... Electric current control unit
41 ... Abnormality annunciating unit
95 ... Inverter restricting unit
Sa ... Temperature sensor
U1 ... Control device

What is claimed is:

1. A motor control device of controlling a motor used in an electric automobile having the motor of driving a vehicle wheel, the automobile comprising:
    an ECU, which is an electric control unit configured to control the automobile in its entirety;
    an inverter device having a power circuit unit including an inverter to convert a direct current power of a battery into an alternating current used in driving the motor, a motor control unit configured to control at least the power circuit unit in accordance with a control of the ECU, and a temperature sensor provided to detect the temperature Tc of the inverter, a plurality of threshold values being set up for the temperature Tc detected; and
    an inverter restricting unit configured to apply a restriction to an electric current command to the inverter, while electric current restricting conditions different from each other are set up for respective temperature regions sorted out by each threshold value, in dependence on the electric current restricting condition of the temperature region to which the detected temperature Tc belongs,
    in which the inverter restricting unit is configured to change a permissible upper limit of a time dependent change dTc/dt of the inverter temperature, in which the temperature Tc is differentiated by time t, in dependence on each sorted temperature region when the time dependent change dTc/dt of the inverter temperature is positive.

2. The motor control device of controlling the motor as claimed in claim 1, in which the inverter restricting unit is configured to set the permissible upper limit of the time dependent change dTc/dt of the inverter temperature, in which the temperature Tc is differentiated by time t, so as to decrease from a low temperature side towards a high temperature side for each of the temperature region in which the detected temperature Tc belongs.

3. The motor control device of controlling the motor as claimed in claim 1, in which the inverter restricting unit is configured to restrict the dTc/dt by controlling an electric current value of the motor.

4. The motor control device of controlling the motor as claimed in claim 1, in which the inverter restricting unit comprises:
    a determining unit configured to determine whether or not the temperature Tc, detected by the temperature sensor, exceeds each of the threshold values; and
    an abnormality annunciating unit configured to output an abnormality annunciation of the inverter to the ECU in the event that the determining unit determines the detected temperature Tc exceeding a predetermined threshold value among the plurality of the thresholds.

5. The motor control device of controlling the motor as claimed in claim 1, in which the motor comprises a plurality of motors, each of the plurality of motors individually driving vehicle wheels of the electric automobile.

6. The motor control device of controlling the motor as claimed in claim 5, further comprising an in-wheel motor drive device in which the motor is in part or in whole disposed inside the vehicle wheel.

7. The motor control device of controlling the motor as claimed in claim 6, in which the in-wheel motor drive device comprises the motor, a wheel support bearing unit and a reduction gear.

8. The motor control device of controlling the motor as claimed in claim 1, further comprising a reduction gear to reduce the speed of rotation of the motor, the reduction gear being a cycloid reduction gear having a speed reducing ration of 4 or higher.

* * * * *